United States Patent
Park

(10) Patent No.: US 11,630,657 B2
(45) Date of Patent: Apr. 18, 2023

(54) SOFTWARE UPDATING SYSTEM AND METHOD OF CONTROLLING THE SAME

(71) Applicants: Hyundai Motor Company, Seoul (KR); Kia Motors Corporation, Seoul (KR)

(72) Inventor: Young Woo Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/134,653

(22) Filed: Dec. 28, 2020

(65) Prior Publication Data
US 2021/0357199 A1    Nov. 18, 2021

(30) Foreign Application Priority Data
May 14, 2020  (KR) .......................... 10-2020-0057499

(51) Int. Cl.
*G06F 8/65*     (2018.01)
*B60W 50/00*    (2006.01)

(52) U.S. Cl.
CPC .............. *G06F 8/65* (2013.01); *B60W 50/00* (2013.01); *B60W 2050/0075* (2013.01); *B60W 2556/45* (2020.02)

(58) Field of Classification Search
CPC . G06F 8/65; B60W 50/00; B60W 2050/0075; B60W 2556/45
See application file for complete search history.

(56) References Cited

U.S. PATENT DOCUMENTS

| | | | |
|---|---|---|---|
| 2003/0182414 A1* | 9/2003 | O'Neill | G06F 9/3004 709/223 |
| 2004/0128281 A1* | 7/2004 | Terazono | G06F 8/65 |
| 2005/0289533 A1* | 12/2005 | Wang | G06F 21/57 707/999.203 |
| 2012/0210311 A1* | 8/2012 | Kikuchi | G06F 9/5038 717/168 |
| 2016/0364232 A1* | 12/2016 | Moeller | H04L 67/34 |
| 2016/0371076 A1* | 12/2016 | Moeller | G06F 8/654 |
| 2018/0018160 A1* | 1/2018 | Teraoka | G06F 8/65 |
| 2019/0243320 A1* | 8/2019 | Quirynen | B25J 9/1607 |
| 2019/0265965 A1* | 8/2019 | Acharya | G06F 8/658 |
| 2021/0089294 A1* | 3/2021 | Urawaki | H03M 7/6005 |
| 2021/0232381 A1* | 7/2021 | Winblad | G06F 9/4403 |
| 2021/0279052 A1* | 9/2021 | Nabar | G06F 21/44 |

FOREIGN PATENT DOCUMENTS

JP    2004355596 A  * 12/2004
KR    10-1189609 B1   10/2012

* cited by examiner

*Primary Examiner* — Daxin Wu
(74) *Attorney, Agent, or Firm* — Fox Rothschild LLP

(57) ABSTRACT

A software updating system based on differential updating for reducing the size of updating data and a method of controlling the same are provided. The method includes acquiring differential data between an original image and an updating image for each of a plurality of updating target controllers included in a vehicle. Then low-ranking differential data is acquired in at least one stage between differential data for each of the plurality of updating target controllers and a plurality of differential combinations are generated for all of the plurality of updating target controllers. An optimum combination of the plurality of differential combinations is then determined and updating data is generated depending to the optimum combination.

18 Claims, 5 Drawing Sheets

SOFTWARE UPDATING SYSTEM AND METHOD OF CONTROLLING THE SAME

CROSS-REFERENCE TO RELATED APPLICATION(S)

This application claims the benefit of Korean Patent Application No. 10-2020-0057499, filed on May 14, 2020, which is hereby incorporated by reference as if fully set forth herein.

BACKGROUND

Field of the Disclosure

The present disclosure relates to a software updating system based on differential updating for reducing the size of updating data and a method of controlling the system.

Discussion of the Related Art

Recently, as the number of functions installed in a vehicle increases, an increased number of controllers has been installed in the vehicle, and software of a controller is frequently updated due to improve functions thereof. A conventional updating method includes transmitting software as an updating target, e.g., the entire controller firmware to a vehicle through diagnosis communication, but as an over the air (OTA) method has been gradually introduced, there has been an attempt to reduce the size of updating data due to a telecommunication fee issue.

A differential updating method may be used as a part of this attempt. The differential updating method refers to a method of performing updating by extracting a difference, i.e., a differential between an existing software image and an updated software image and applying the differential to the existing software image. Thus, in the differential updating method, as a difference between the existing software image and the updated software image is reduced, the differential is also reduced, and thus the size of the updating data is substantially reduced.

However, when a general differential updating method is applied to a vehicle, only a software change of a single controller is considered, and accordingly when software of a plurality of controllers is updated in a recent vehicle in which numerous controllers are installed, it is difficult to optimize the size of updating data.

In particular, the general differential updating method is mainly based on a difference in software version (that is, a temporal difference), but recent vehicle controllers that are updated at the same time share many architectures, for example, cooperative control for a single function and thus also have software similarity (that is, spatial similarity). For example, in accordance with recent trends, software having the same open source or the same solution has been increasingly used in similar functions, and accordingly, when a communication function between controllers is updated, communication function related parts of software of a plurality of controllers that participates in communication may be applied in the same or similar way.

Accordingly, there is a need for a method of optimizing the size of updating data in consideration of even similarity of updated controller software, which is applicable to update the entire controller at a vehicle level but not at a single controller level.

SUMMARY

An object of the present disclosure is to provide a software updating system for more effectively performing software updating based on a differential updating method and a method of controlling the system. In particular, the present disclosure provides a software updating system for optimizing the size of updating data when a plurality of controllers is simultaneously updated and a method of controlling the same.

The technical problems solved by the exemplary embodiments are not limited to the above technical problems and other technical problems which are not described herein will become apparent to those skilled in the art from the following description.

To achieve these objects and other advantages and in accordance with the purpose of the invention, as embodied and broadly described herein, a method of updating software may include acquiring differential data between an original image and an updating image for each of a plurality of updating target controllers included in a vehicle, by an updating server, acquiring low-ranking differential data in at least one stage between differential data for each of the plurality of updating target controllers, generating a plurality of differential combinations for all of the plurality of updating target controllers, determining an optimum combination of the plurality of differential combinations, and generating updating data depending to the optimum combination.

In another aspect of the present disclosure, a method of updating software may include receiving updating data and a combination formula for updating software of a plurality of updating target controllers from an updating server in a vehicle including a plurality of controllers, acquiring differential data corresponding to a differential between an original image and an updating image for each of the plurality of updating target controllers by applying the combination formula to at least one differential data and a plurality of low-ranking differential data included in the updating data, and performing updating using differential data for each of the plurality of updating target controllers.

In another aspect of the present disclosure, an updating server may include a differential calculator configured to acquire differential data between an original image and an updating image for each of a plurality of updating target controllers included in a vehicle, and to acquire low-ranking differential data in at least one stage between differential data for each of the plurality of updating target controllers, and a differential combination policy determiner configured to generate a plurality of differential combinations for all of the plurality of updating target controllers, to determine an optimum combination of the plurality of differential combinations, and to generate updating data depending to the optimum combination.

In another aspect of the present disclosure, a vehicle may include a gateway, and a plurality of controllers connected to the gateway, wherein the gateway is configured to receive updating data and a combination formula for updating software of a plurality of updating target controllers among the plurality of controllers from an updating server, and acquire differential data corresponding to a differential between an original image and an updating image for each of the plurality of updating target controllers by applying the combination formula to at least one differential data and a plurality of low-ranking differential data included in the updating data.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
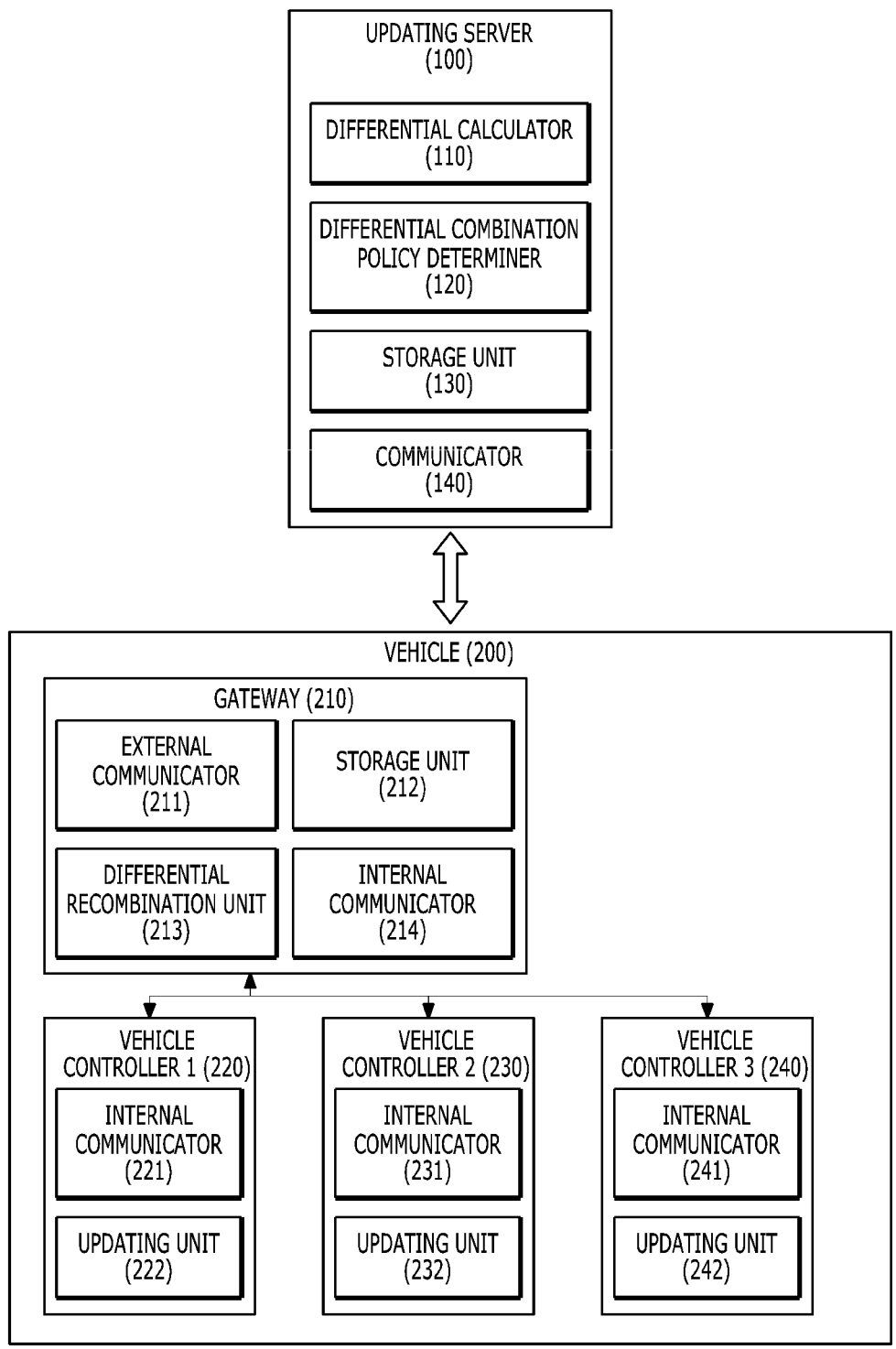
FIG. 1 is a diagram showing an example showing the configuration of a software updating system applicable to exemplary embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure are described in detail with reference to the accompanying drawings so that those of ordinary skill in the art may easily implement the same. However, the present disclosure may be implemented in various different forms, and is not limited to these exemplary embodiments. To clearly describe the present disclosure, parts not concerning the description are omitted from the drawings, and like reference numerals denote like elements throughout the specification. The same reference numbers will be used throughout the drawings and the specification to refer to the same parts.

According to an exemplary embodiment of the present disclosure, when software of a plurality of controllers is updated, updating data having an optimum size may be generated by generating differential data for each controller as an updating target, generating low-ranking differential data in at least one stage in differential data, and comparing combinations between differential data and low-raking differential data.

FIG. 1 is a diagram showing an example showing the configuration of a software updating system applicable to exemplary embodiments of the present disclosure. Referring to FIG. 1, the software updating system may include an updating server 100 configured to prepare and provide updating data, and a vehicle 200 configured to receive the updating data from the updating server 100 and update software.

The updating server 100 may include a differential calculator 110, a differential combination policy determiner 120, a storage unit 130, and a communicator 140, and the vehicle 200 may include a gateway 210 and a plurality of vehicle controllers 220, 230, and 240 connected to the gateway 210. First, components of the updating server 100 will be described.

The differential calculator 110 may be configured to generate differential data in at least two stages when software of a plurality of updating target devices (hereinafter, which is assumed to be a "controller" for convenience) needs to be updated together by performing updating at one time. In particular, the differential calculator 110 may be configured to generate differential data by comparing an original image corresponding to a previous version of software with an updating image corresponding to a recent version of software (i.e., updating software) with respect to each of software installed in a plurality of controllers. The differential data between the original image and the updating image with respect to the same controller may be referred to as a primary differential.

The differential calculator 110 may be configured to generate low-ranking differential data, i.e., a secondary differential by comparing primary differentials for different controllers. When the number of controllers as a software updating target is three in a corresponding round, a tertiary differential that is a difference between the secondary differentials may also be generated. In other words, when the number of controllers as a software updating target is N (here, N is a natural number equal to or greater than 2), the differential calculator 110 according to an exemplary embodiment may be configured to generate a minimum of the secondary differential, and as necessary, may be configured to generate a maximum of an $N^{th}$ order differential.

The differential combination policy determiner 120 may be configured to generate a differential combination for all controllers as a updating target based on the differential data and low-ranking differential data thereof that are generated by the differential calculator 110 and may be configured to determine a total size for each differential combination. The differential combination policy determiner 120 may be configured to generate updating data by comparing total sizes for respective differential combinations and selecting optimum (e.g., a total size is the minimum) differential combinations and may derive information on a combination formula thereof.

The storage unit 130 may be configured to store source data, intermediate data, and final data that are required or generated in an operating procedure of the differential calculator 110 and the differential combination policy determiner 120, and for example, the source data may include an original image and an updating image for each controller as a software updating target. The intermediate data may include differential data and low-ranking differential data for each controller, total-size data for each differential combination, and a combination formula for each differential combination.

The final data may include updating data having an optimum size and information on a combination formula thereof, but the present disclosure is not limited thereto. The communicator 140 may be configured to perform wireless communication with the gateway 210 of the vehicle 200, and in response to receiving an updating request from the vehicle 200, the communicator 140 may be configured to transmit updating data of the corresponding vehicle 200 and the information on the combination formula.

Hereinafter, each component of the vehicle 200 will be described. The gateway 210 may be configured to communicate with components inside and outside of a vehicle, and thus may be configured to acquire updating data from the updating server 100, may be configured to recombine data at a level at which a controller is capable of performing updating, and may then be configured to transmit the recombined data to each of the vehicle controllers 220, 230, and 240. Accordingly, the gateway 210 may include an external communicator 211 configured to communicate with at least the updating server 100, a storage unit 212 configured to store updating data acquired from the updating server 100, a differential recombination unit 213 configured to generate differential data or an updating image for each controller, generated based on the updating data, and an internal communicator 214 configured to communicate with a component inside a vehicle, such as the vehicle controllers 220, 230, and 240.

The vehicle controllers 220, 230, and 240 may have similar configurations, and thus will be described in terms of the interest of vehicle controller 1 220. An internal communicator 221 may be configured to communicate with the gateway 210 or the other controllers 230 and 240 in a corresponding vehicle network, and an updating unit 222 may be configured to perform software updating on the corresponding controller 220 based on differential data or an updating image, provided by the gateway 210, according to whether differential updating is supported.

The internal communicator 214 of the gateway 210 and internal communicators 221, 231, and 241 of the respective vehicle controllers 220, 230, and 240 may be configured to perform communication according to the same vehicle communication protocol. For example, the vehicle communication protocol may include CAN, CAN-FD, LIN, or the Ethernet, but the present disclosure is not limited thereto.

Figure 2A:
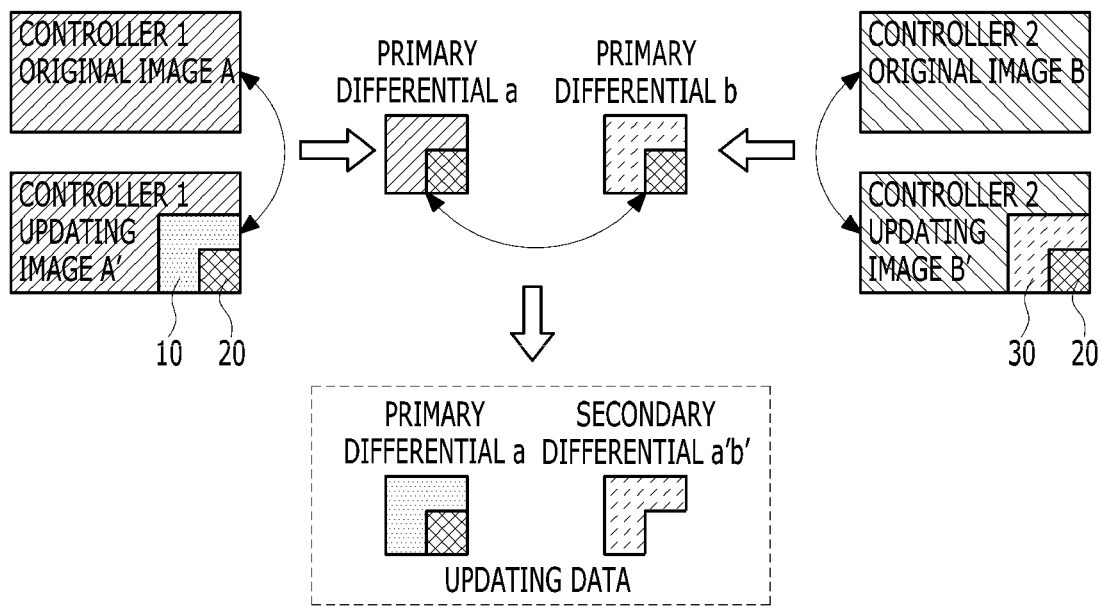
FIG. 2A is a diagram for explaining a concept of generation of updating data according to an exemplary embodiment of the present disclosure.
Figure 2B:
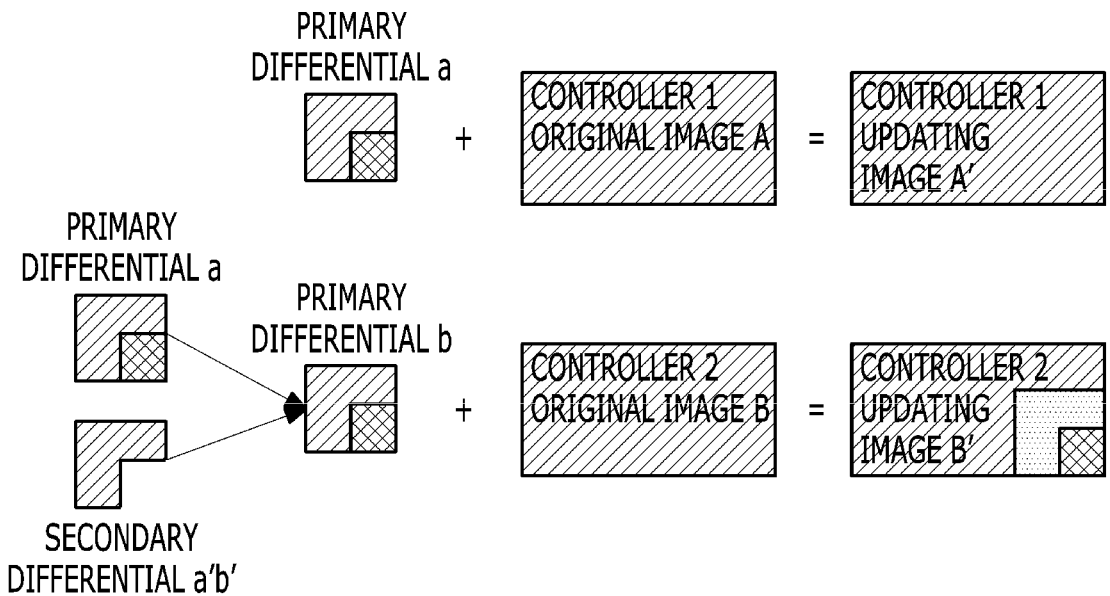
FIG. 2B is a diagram for explaining a concept of an updating procedure using updating data.

FIG. 2A is a diagram for explaining a concept of generation of updating data according to an exemplary embodiment of the present disclosure. FIG. 2B is a diagram for explaining a concept of an updating procedure using updating data. First, referring to FIG. 2A, it may be assumed that the updating server 100 performs software updating on two controllers (controllers 1 and 2).

In the differential calculator 110 of the updating server 100, a primary differential a for the controller 1 may be generated by comparing an original image A and an updating image A' of the controller 1 (i.e., A'-A), and a primary differential b for the controller 2 may be generated by comparing an original image B and an updating image B' of the controller 2 (i.e., B'-B). In particular, when the primary differential a for the controller 1 includes a part 10 corresponding to only the controller 1 and a part 20 that commonly corresponds to the controller 1 and the controller 2 and the primary differential b for the controller 2 includes a part 30 corresponding to only the controller 2 and a part 20 that commonly corresponds to the controller 1 and the controller 2, if each of the primary differentials a+b is included in the updating data, the commonly part 20 is unnecessarily redundant.

Accordingly, according to the present exemplary embodiment, the size of updating data may be optimized by acquiring secondary differential a'b' via comparison between primary differentials (i.e., a-b) and configuring updating data to contain the primary differential a and the secondary differential a'b' for the controller 1. In particular, a reception side (i.e., a vehicle) of updating data needs to restore the primary differential b to update a differential, and thus a combination formula (i.e., a+a'b'=b) for restoring the primary differential b based on updating data may be provided together to a reception side.

As shown in FIG. 2A, when the generated updating data and combination formula are transmitted to the vehicle 200, the vehicle 200 may be configured to acquire an updating image as shown in FIG. 2B. Referring to FIG. 2B, first, the primary differential a for the controller 1 is originally included in updating data, and thus, when the primary differential a is applied to the original image A of the controller 1, the updating image A' for the controller 1 may be immediately acquired. In contrast, the primary differential b for the controller 2 is not included in updating data, and thus the primary differential for the controller 2 may be obtained by combining the primary differential a and the secondary differential a'b' for the controller 1 according to the combination formula (i.e., a+a'b'=b). The updating image B' may be obtained by combining the primary differential b for the controller 2 with the original image B for the controller 2 again.

Particularly, when a separate controller provides a differential updating function, a gateway of a vehicle may be configured to restore only differential data for each controller based on updating data and transmit the restored differential data to each controller, and then, the controller may be configured to perform updating on the differential data. In contrast, when a separate controller does not provide a differential updating function, a gateway may be configured to generate an updating image by acquiring an original image from each controller and then applying differential data to the acquired original image and may then be configured to provide the corresponding updating image to a separate controller.

Figure 3:
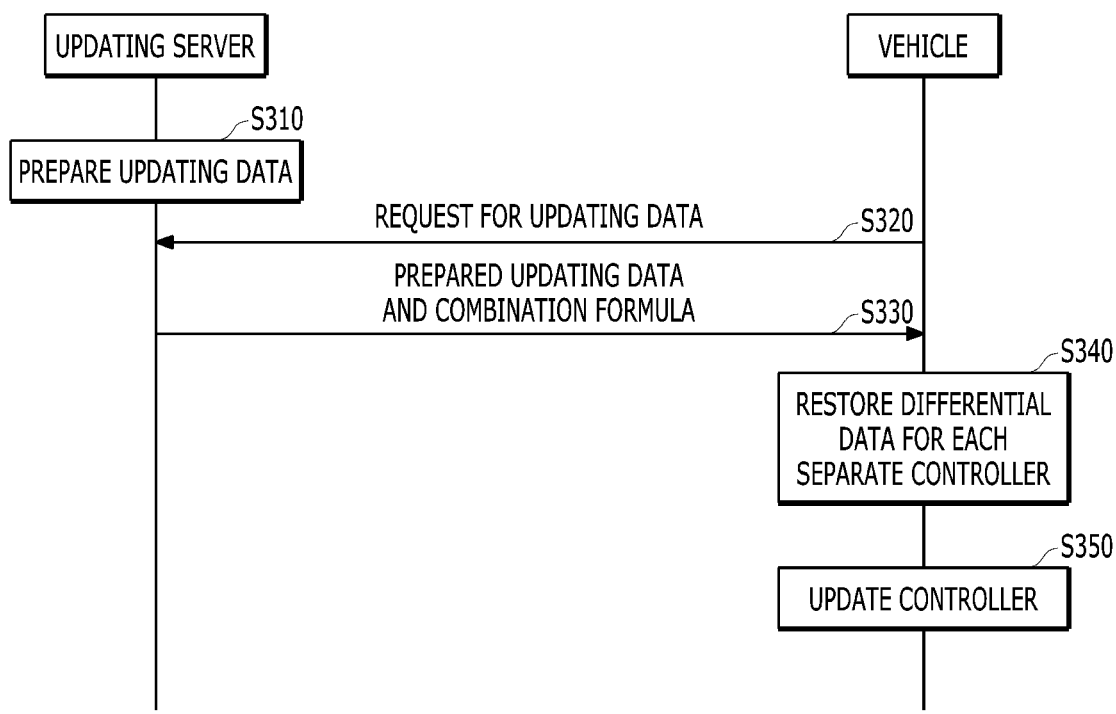
FIG. 3 is a flowchart showing an example of a procedure of updating software according to an exemplary embodiment of the present disclosure.

The updating procedure according to the present exemplary embodiment described thus far is summarized in a flowchart of FIG. 3. FIG. 3 is a flowchart showing an example of a procedure of updating software according to an exemplary embodiment of the present disclosure. Referring to FIG. 3, the updating server 100 may be configured to prepare updating data based on the method described above with reference to FIG. 2A (S310).

When a vehicle generates and transmits a request to an updating server for updating data (S320), the updating server may be configured to transmit prepared updating data and a combination formula corresponding thereto to the vehicle (S330). In particular, the request for updating data (S320) may be performed in response to notification that is first transmitted to a vehicle as the updating server completely prepares updating data or may be performed by periodically checking whether updating data is prepared in a vehicle.

The gateway of the vehicle may be configured to acquire or restore differential data for each controller using the updating data and the combination formula (S340) and a separate updating target controller may be configured to update a controller based on the differential data (S350). When the number of updating target controllers is two, the restoring operation S340 may be performed as shown in FIG. 2B, and when the number of updating target controllers is three, if a, a'b', and b'c' are received as updating data, the differential data a for the controller 1 is already included in the updating data, and thus separate computation for restoration may not be required. The differential data b for the controller 2 may be acquired according to a+a'b'=b, and differential data c for a controller 3 may be acquired according to b+b'c'=c.

Needless to say, when a separate controller does not support an updating function based on differential data, a gateway may be configured to generate an updating image by applying an original image to differential data and may then be configured to provide the updating image to a separate controller. Hereinafter, the data preparing operation S310 of FIG. 3 will be described in more detail with reference to FIG. 4.

Figure 4:
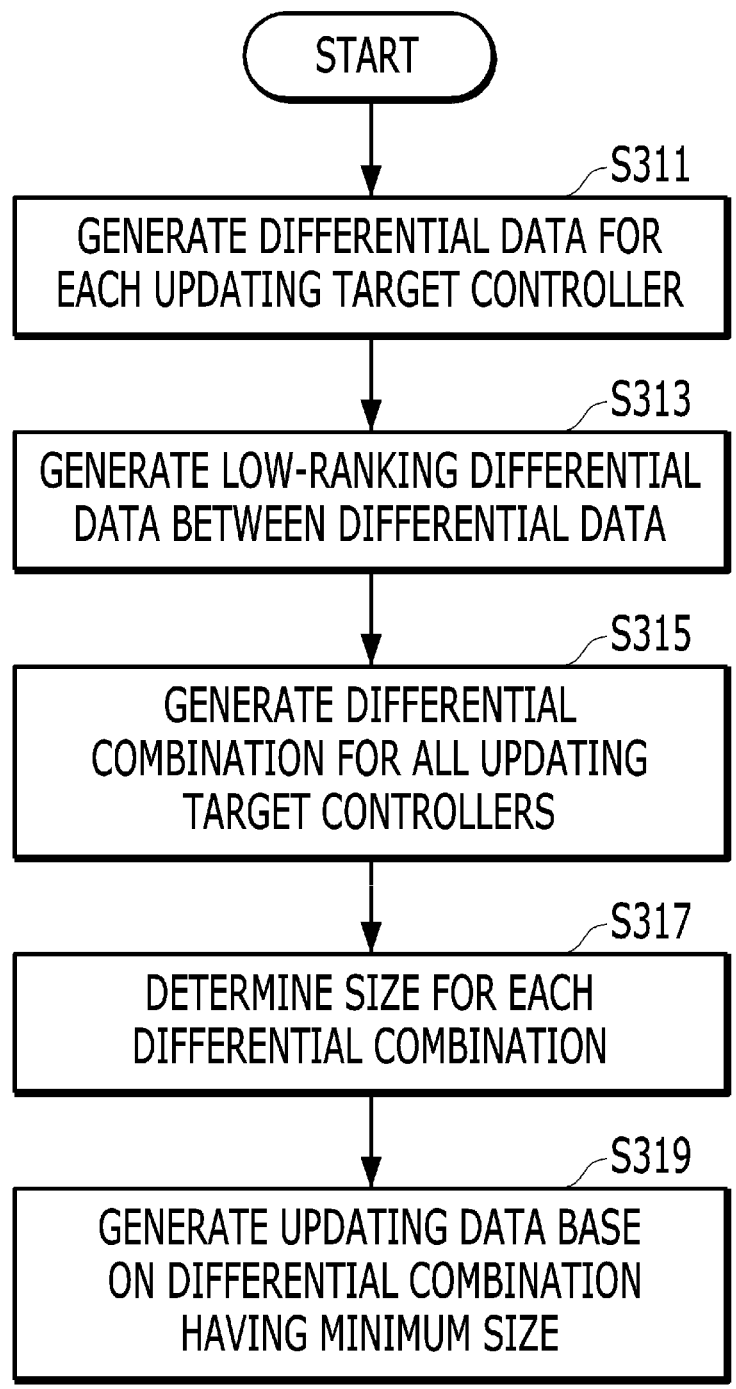
FIG. 4 is a flowchart showing an example of a procedure of preparing updating data according to an exemplary embodiment of the present disclosure.

FIG. 4 is a flowchart showing an example of a procedure of preparing updating data according to an exemplary embodiment of the present disclosure. Referring to FIG. 4, when a target controller that needs to be updated is selected, the updating server 100 may be configured to repeatedly perform a procedure of searching a differential combination for transmitting the minimum size of updating data in terms of the entire vehicle and calculating the total size of data for each combination.

In particular, the differential calculator 110 may be configured to extract differential data (i.e., the primary differential) for a separate controller as a software updating target (S311). As described above, the present procedure may be performed using a difference between an updating image and an original image of a separate controller. For example, when an original image for the controller 1 220 is A and an updating image is A', the differential data a for the controller 1 220 may be acquired according to A'-A. The procedure may be performed with respect to each of all updating target controllers.

Then, the differential calculator 110 may be configured to generate low-ranking differential data corresponding to at least one stage between differential data with respect to all combinations of the generated differential data (i.e., the primary differential) (S313). For example, primary differentials for the controller 1 220, the controller 2 230, and the controller 3 240 are a, b, and c, respectively, secondary differentials may be a differential a'b' between a and b, a differential b'c' between b and c, and a differential a'c' between a and c and may be calculated according to a'b'=a−b, a'c'=a−c, and b'c'=b−c, respectively. Needless to say, as necessary, tertiary, quaternary, or an 4th or greater low-ranking differential may also be acquired.

When the differential data and the low-ranking differential data are acquired, the differential combination policy determiner 120 may be configured to generate differential combinations for all updating target controllers (S315) and determine a size for each differential combination (S317). Particularly, the differential combination may refer to any combination for making all differential data (e.g., a, b, and c) of separate controllers. Thus, the differential combination policy determiner 120 may be configured to generate updating data based on a differential combination having the minimum size (S319).

Figure 5:
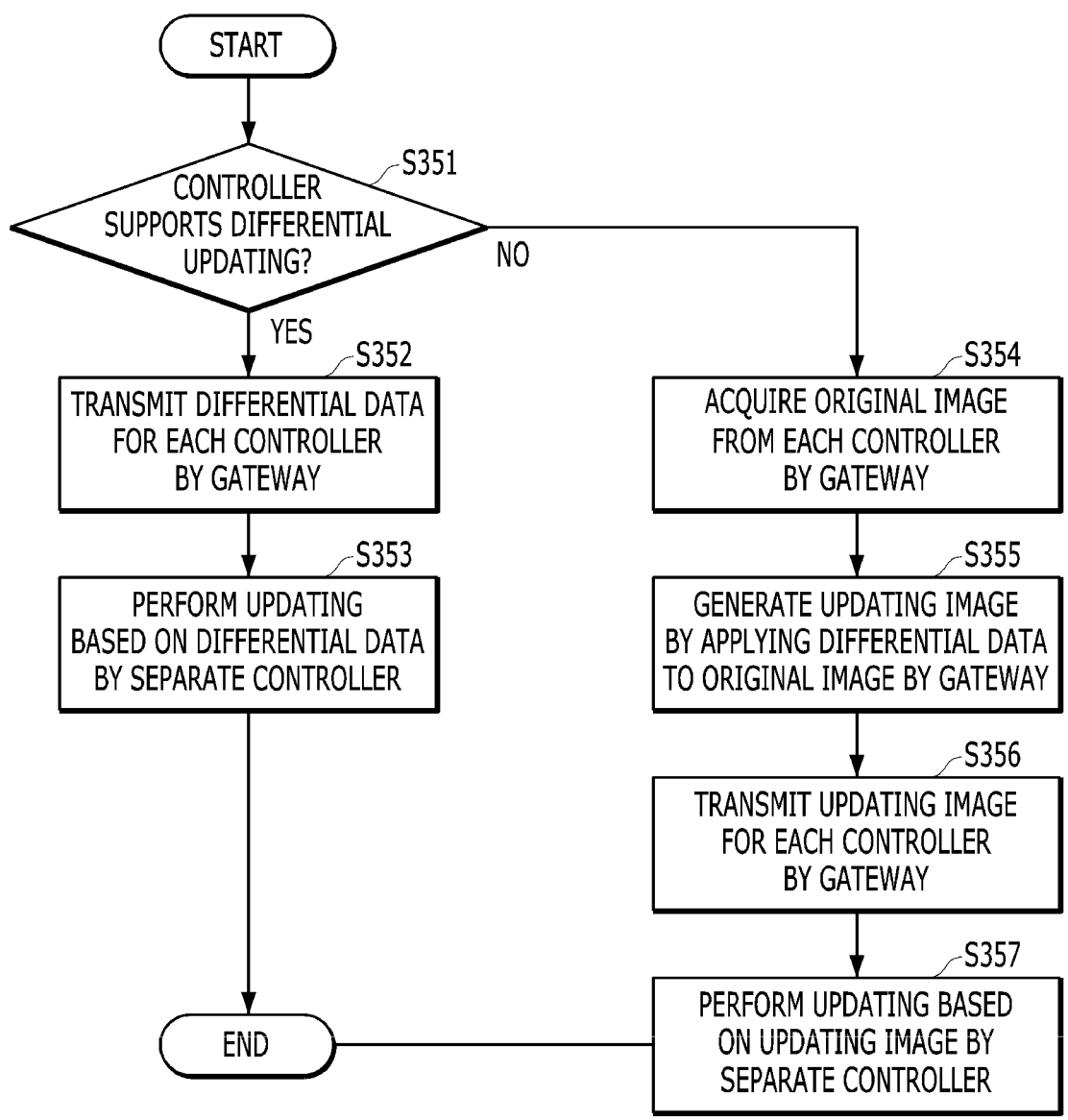
FIG. 5 is a flowchart showing an example of an updating procedure according to an exemplary embodiment of the present disclosure.

Hereinafter, the controller updating procedure S350 of FIG. 3 will be described in more detail with reference to FIG. 5. FIG. 5 is a flowchart showing an example of an updating procedure according to an exemplary embodiment of the present disclosure.

Referring to FIG. 5, the gateway 210 may be configured to determine whether each updating target controller supports differential updating (S351). In particular, in the procedure, whether each controller connected to the corresponding gateway 210 supports differential updating may refer to a prewritten table, and depending on the configuration of a vehicle, operation S352 or S354 may be directly performed according to a preset logic without a determination procedure such as the present procedure. When differential updating is supported (YES of S351), the gateway may be configured to transmit differential data corresponding to each controller for supporting the differential updating (S352), and the separate controller that receives the differential data may be configured to perform updating based on differential updating (S353).

When a controller that does not support differential updating is present (NO of S351), the gateway may be configured to acquire an original image from each of the corresponding controllers (S354). The gateway may be configured to generate an updating image by applying corresponding differential data to each of the acquired original images (S355) and may then be configured to transmit the updating image to the corresponding controller (S356). Accordingly, the separate controller may be configured to perform software updating using the updating image (S357). As described above, since the gateway considers whether differential updating is supported for each controller, it is not required to change an updating method in terms of a separate controller, advantageously.

In the updating system and the method of controlling the same according to the aforementioned exemplary embodiments, software updating for a vehicle controller is assumed, but the present disclosure is not limited thereto and may be applied to any device that performs software updating. The gateway 210 of the vehicle according to an exemplary embodiment may be replaced with a controller (e.g., a telematics unit or an AVN system) in another vehicle, which is connected to a network inside the vehicle and is wirelessly connectable to the updating server 100 outside the vehicle.

According to an exemplary embodiment of the present disclosure, when updating data is extracted using a method of acquiring differential data (i.e., a primary differential) between the updating image and the original image of a controller and then acquiring low-ranking differential data (i.e., a secondary differential) has been described. However, the method according to the present disclosure may be modified to a method of acquiring a differential between controllers, i.e., a primary differential between updating images and then acquiring a secondary differential for an original image.

According to an exemplary embodiment of the present disclosure, the gateway restores the differential data, but according to another exemplary embodiment, a separate controller may be configured to restore the differential data. In addition, according to an exemplary embodiment of the present disclosure, a method of selecting an optimum differential combination is assumed to be a method of minimizing the size of data for updating, but according to another exemplary embodiment, differential combinations, the number of which is changed depending on a situation of the vehicle and the server, such as the number of updating target controllers, or computation capability and storage capacity of the server, may also be applied.

According to the aforementioned exemplary embodiments of the present disclosure, the size of data to be transmitted to the vehicle when controller software of the vehicle is updated may be minimized. In other words, when there is similarity in software between controllers, the size of transmitted data may be minimized by generating additional differential data in software between controllers. The differential may be restored using a vehicle gateway and the updating image may be generated by applying the differential data to the original image, and thus the exemplary embodiments of the present disclosure may also be applied to the case in which the differential updating method is not supported by a controller.

In addition, a data transmission rating may be minimized, and thus a time and data costs for receiving updating data from the updating server may be reduced, and a time taken to transmit data through a network inside the vehicle during updating may be reduced. Further, a time taken to update the entire vehicle may be reduced by simultaneously updating software of controllers in units of vehicles rather than sequentially updating software in units of controllers.

The software updating system related to at least one exemplary embodiment of the present disclosure as configured above may more effectively update software based on a differential updating method. In particular, according to the present disclosure, differential data is extracted in two or more stages, and thus when a plurality of controllers updated simultaneously, the size of updating data may be optimized.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer-readable code stored on a non-transitory computer-readable recording medium. The non-transitory computer-readable recording medium is any data storage device that may store data which can thereafter be read by a computer. Examples of the non-transitory computer-readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations may be made in the present disclosure without departing from the spirit or scope of the inventions. Thus, it is intended that the present disclosure cover the modifications and variations of this invention provided they come within the scope of the appended claims and their equivalents.

What is claimed is:

1. A method of updating software, comprising:
   acquiring, by an updating server, differential data between an original image and an updating image for each of a plurality of updating target controllers included in a vehicle;
   acquiring low-ranking differential data obtained by subtracting a common image between the differential data for each of the plurality of updating target controllers;
   generating a plurality of differential combinations for all of the plurality of updating target controllers;
   determining an optimum combination of the plurality of differential combinations; and
   generating updating data depending to the optimum combination,
   wherein the plurality of differential combinations includes all of the differential data and all of the low-ranking differential data, and
   wherein the optimum combination includes some of the plurality of differential data and all of the low-ranking differential data.

2. The method of claim 1, further comprising transmitting the generated updating data to the vehicle.

3. The method of claim 2, wherein the transmitting includes transmitting a combination formula for restoring the differential data for each of the plurality of updating target controllers based on the updating data, to the vehicle.

4. The method of claim 2, wherein the transmitting is performed in response to receiving is an updating request from the vehicle.

5. The method of claim 1, wherein the determining of the optimum combination is performed based on at least one of a total size of data for each of the plurality of differential combinations, computation capability of the updating server, and a number of the updating target controllers.

6. A method of updating software, comprising:
   receiving updating data and a combination formula for updating software of a plurality of updating target controllers from an updating server in a vehicle including a plurality of controllers;
   acquiring differential data corresponding to a differential between an original image and an updating image for each of the plurality of updating target controllers by applying the combination formula to the updating data; and
   performing updating using differential data and low ranking differential data included in the updating data for each of the plurality of updating target controllers,
   wherein the low-ranking differential data are obtained by subtracting a common image between the differential data for each of the plurality of updating target controllers,
   wherein the updating data inlcudes some of the differential data and all of the low-ranking differential data, and
   wherein the differential data included in the updating data are the data between an original image and an updating image for each of a plurality of udating target controllers.

7. The method of claim 6, wherein the performing of the updating includes transmitting, by a gateway, differential data corresponding to at least one updating target controller for supporting differential updating among the plurality of updating target controllers.

8. The method of claim 6, wherein the performing updating includes:
acquiring, by a gateway, the original image from each of at least one updating target controller that does not support differential updating among the plurality of updating target controllers;
acquiring, by the gateway, the updating image by applying the differential data to each acquired original image; and
transmitting the acquired updating image to each of the at least one updating target controller that does not support the differential updating.

9. A non-transitory computer-readable recording medium having recorded thereon a program for executing the method of claim 1.

10. An updating server, comprising:
a differential calculator including a processor configured to acquire differential data between an original image and an updating image for each of a plurality of updating target controllers included in a vehicle, and to acquire low-ranking differential data; and
a differential combination policy determiner including a processor configured to generate a plurality of differential combinations for all of the plurality of updating target controllers, to determine an optimum combination of the plurality of differential combinations, and to generate updating data depending to the optimum combination,
wherein the low-ranking differential data are obtained by subtracting a common image between the differential data for each of the plurality of updating target controllers,
wherein the plurality of differential combinations includes all of the differential data and all of the low-ranking differential data, and
wherein the optimum combination includes some of the plurality of differential data and all of the low-ranking differential data.

11. The updating server of claim 10, wherein the plurality of differential combinations includes a combination for acquiring the differential data for each of the plurality of updating target controllers together.

12. The updating server of claim 10, further comprising a communicator including a processor configured to transmit the generated updating data to the vehicle.

13. The updating server of claim 12, wherein the processor of the communicator is configured to transmit a combination formula for restoring the differential data for each of the plurality of updating target controllers based on the updating data, to the vehicle.

14. The updating server of claim 12, wherein the processor of the communicator is configured to transmit the updating data in response to receiving an updating request from the vehicle.

15. The updating server of claim 10, wherein the processor of the differential combination policy determiner is configured to determine the optimum combination in consideration of at least one of a total size of data for each of the plurality of differential combinations, computation capability of the updating server, and a number of the updating target controllers.

16. A vehicle, comprising:
a gateway; and
a plurality of controllers connected to the gateway,
wherein the gateway is configured to:
receive updating data and a combination formula for updating software of a plurality of updating target controllers among the plurality of controllers from an updating server, and
acquire differential data corresponding to a differential between an original image and an updating image for each of the plurality of updating target controllers by applying the combination formula to the updating data,
wherein the updating data includes some of the differential data and all of a low-ranking differential data,
wherein the differential data included in the updating data are the data between an original image and an updating image for each of a plurality of updating target controllers, and
wherein the low-ranking differential data are obtained by subtracting a common image between the differential data for each of the plurality of updating target controllers.

17. The vehicle of claim 16, wherein:
the gateway is configured to transmit differential data corresponding to at least one updating target controller for supporting differential updating among the plurality of updating target controllers; and
the at least one updating target controller for supporting the differential updating updates software through a differential updating method using the transmitted differential data.

18. The vehicle of claim 16, wherein the gateway is configured to acquire the original image from each of at least one updating target controller that does not support differential updating among the plurality of updating target controllers, acquire the updating image by applying the differential data to each acquired original image, and transmit the acquired updating image to each of the at least one updating target controller that does not support the differential updating.

* * * * *